US011073556B2

(12) United States Patent
Cheng et al.

(10) Patent No.: US 11,073,556 B2
(45) Date of Patent: Jul. 27, 2021

(54) LOW PIN COUNT REVERSIBLE SCAN ARCHITECTURE

(71) Applicant: Mentor Graphics Corporation, Wilsonville, OR (US)

(72) Inventors: Wu-Tung Cheng, Lake Oswego, OR (US); Yu Huang, West Linn, OR (US)

(73) Assignee: Siemens Industry Software Inc., Plano, TX (US)

( * ) Notice: Subject to any disclaimer, the term of this patent is extended or adjusted under 35 U.S.C. 154(b) by 0 days.

(21) Appl. No.: 16/856,094

(22) Filed: Apr. 23, 2020

(65) Prior Publication Data

US 2020/0341057 A1 Oct. 29, 2020

Related U.S. Application Data

(60) Provisional application No. 62/837,215, filed on Apr. 23, 2019.

(51) Int. Cl.
*G01R 31/3177* (2006.01)
*G06F 30/333* (2020.01)
*G01R 31/317* (2006.01)
*G06F 119/12* (2020.01)
*G06F 119/02* (2020.01)

(52) U.S. Cl.
CPC ... *G01R 31/3177* (2013.01); *G01R 31/31724* (2013.01); *G06F 30/333* (2020.01); *G06F 2119/02* (2020.01); *G06F 2119/12* (2020.01)

(58) Field of Classification Search
CPC .......... G01R 31/3177; G01R 31/31724; G06F 30/333; G06F 2119/02; G06F 2119/12

USPC .......................................... 714/727, 726, 72
See application file for complete search history.

(56) References Cited

U.S. PATENT DOCUMENTS

| 5,719,913 | A * | 2/1998 | Maeno | G11C 19/00 377/54 |
|---|---|---|---|---|
| 9,222,978 | B2 | 12/2015 | Huang et al. | |
| 10,156,607 | B2 | 12/2018 | Goel et al. | |
| 2009/0089637 | A1* | 4/2009 | Jun | G01R 31/318541 714/729 |
| 2012/0008731 | A1* | 1/2012 | Hsu | G09G 3/3674 377/79 |
| 2013/0083885 | A1* | 4/2013 | Lee | G11C 19/28 377/69 |
| 2014/0223247 | A1* | 8/2014 | Rajski | G01R 31/318563 714/726 |

(Continued)

OTHER PUBLICATIONS

"Bidirectional Scan Chain for Digital Circuit Testing", IP.com, No. 21, 2007.

(Continued)

*Primary Examiner* — John J Tabone, Jr.

(57) ABSTRACT

A circuit comprises a plurality of scan chains configured to perform scan shifting in two opposite directions and a register configured to store a first signal. The first signal determines whether the plurality of scan chains operate in a first mode or a second mode. The plurality of scan chains operating in the first mode is configured to perform, based on a second signal, either scan shifting in a first direction in the two opposite directions or scan capturing during a test; the plurality of scan chains operating in the second mode is configured to perform, based on the second signal, scan shifting in the first direction or a second direction in the two opposite directions.

20 Claims, 7 Drawing Sheets

(56) References Cited

U.S. PATENT DOCUMENTS

2020/0333398 A1* 10/2020 Huang ........... G01R 31/318544
2021/0033669 A1* 2/2021 Cheng ................ G01R 31/3177

OTHER PUBLICATIONS

Peilin Song et al., "A Novel Scan Chain Diagnostics Technique Based on Light Emission from Leakage Current", IEEE International Test Conference 2004, Paper 6.2, pp. 140-147.

* cited by examiner

LOW PIN COUNT REVERSIBLE SCAN ARCHITECTURE

RELATED APPLICATIONS

This application claims the benefit of U.S. Provisional Patent Application No. 62/837,215, filed on Apr. 23, 2019, which application is incorporated entirely herein by reference.

FIELD OF THE DISCLOSED TECHNIQUES

The presently disclosed techniques relates to circuit testing. Various implementations of the disclosed techniques may be particularly useful for scan chain diagnosis.

BACKGROUND OF THE DISCLOSED TECHNIQUES

Building circuits on silicon as test chips can provide insight into how a new fabrication process works. Traditionally, semiconductor manufacturers relied mainly on SRAM (static random-access memory) test chips for ramping up, qualifying and monitoring new semiconductor fabrication processes. The transistor and circuit geometries used on an SRAM test chip, however, represent only a small fraction of the transistor and circuit geometries found in a real product. In recent years, test chips with logic circuit components (logic test chips hereinafter) are often utilized to supplement or replace SRAM test chips. While more closely representing chips with real circuit designs, the logic test chips are not as easily testable or diagnosable as the SRAM test chips.

To check whether a logic test chip is fabricated according to the design and to locate potential defects, scan testing is usually employed. In this technique, a series of known values (test stimuli or test pattern) are shifted-in (or loaded into) state elements called scan cells through their sequential inputs. These scan cells are interconnected into scan chains for scan testing. The shifting-in occurs by placing the integrated circuit in a special mode, known as shift mode, and then applying a series of clock pulses, called "shift pulses" or "shift clock pulses." Each shift clock pulse pushes a bit of test stimuli into a scan cell in each of the scan chains. This continues until all scan cells in the scan chains are filled with test pattern bits. Then, one or more clock pulses, called "capture pulses" or "capture clock pulses," are applied to the circuit as they would be in normal operation. This is referred to as capture mode. After the test pattern bits are injected into the circuit, the results of the test (test responses) are "captured" and stored in the scan cells. The circuit then returns to shift mode, and with each additional clock pulse, a bit of the test responses is pushed or shifted out as each bit of new test pattern is pushed or shifted in. The shifted out test responses are then compared with expected results to determine and locate any errors. Shift mode and capture mode together may be called as test mode.

Scan chains and their associated clock circuitry are themselves a major source of circuit failures. It has been reported that defects occurring on scan chains account for about 30% to 50% of all failing chips. Thus, scan chains need to be tested and diagnosed first. As discussed in detail below, faulty scan chains can be detected using relatively simple methods. Locating defective scan cells, however, are challenging. Physical failure analysis instruments, combined with a tester, are sometimes used to search for defective responses along scan chains. These hardware-based methods often rely on specially-designed scan chains and scan cells. While effective in isolating scan chain defects, the requirement of extra hardware may not be acceptable in many realistic products. Further, it is difficult to apply these methods to chips with embedded compression circuits without resorting to a bypass mode.

Software-based techniques use algorithmic diagnosis procedures to identify failing scan cells. It may run chain diagnosis with conventional scan chains with or without embedded compressions. The current software-based chain diagnosis techniques may be further classified into two categories: model-based algorithms and data-driven algorithms. In a model-based chain diagnosis process, fault models and pattern simulation are used. In a data-driven chain diagnosis process, signal profiling, filtering and edge detections are applied. Each category of algorithms has its own advantages and disadvantages. These two can also be combined to increase diagnosis resolution and accuracy. While conventional methods may achieve satisfactory results for a defect behaving exactly like a modeled fault (e.g. stuck-at-0 fault at a scan cell's output), a defect in a scan chain often exhibits un-modeled faulty behavior (e.g. intermittent faulty behavior). For the un-modeled faults, both the diagnostic accuracy and resolution could degrade significantly.

Using bidirectional scan chains (or reversible scan chains) to improve the chain diagnostic accuracy and resolution was first proposed by P. Song, "A New Scan Structure for Improving Scan Chain Diagnosis and Delay Fault Coverage," Proc. 9th IEEE North Atlantic Test Workshop (NATW), 2000, pp. 14-18. A similar technique was discussed by a paper published by Ip.com on Nov. 21, 2007, entitled "Bidirectional Scan Chain for Digital Circuit Testing." U.S. Pat. Nos. 9,222,978 and 10,156,607 also disclosed performing both forward and backward scan tests via reversible scan chains. The scan architectures in all of these disclosures share one characteristics: two dynamically changed control signals are simultaneously supplied, one for controlling scan shifting vs. scan capturing and the other for controlling the direction of the scan shifting. Accordingly, a revisable scan architecture needs an extra input pin compared to a conventional scan architecture. It is advantageous to eliminate the need for the extra input pin.

BRIEF SUMMARY OF THE DISCLOSED TECHNIQUES

Various aspects of the disclosed technology relate to low pin count scan architecture capable of bi-directional scan shifting. In one aspect, there is a circuit, comprising: a plurality of scan chains configured to perform scan shifting in two opposite directions; and a register configured to store a first signal, the first signal determining whether the plurality of scan chains operate in a first mode or a second mode, wherein the plurality of scan chains operating in the first mode is configured to perform, based on a second signal, either scan shifting in a first direction in the two opposite directions or scan capturing during a test, and wherein the plurality of scan chains operating in the second mode is configured to perform, based on the second signal, scan shifting in the first direction or a second direction in the two opposite directions.

The circuit may further comprise: a signal processing circuit configured to generate a scan enable signal and a scan directional signal based on the first signal and the second signal, the scan enable signal determining whether the plurality of scan chains perform scan shifting or scan capturing during a test, the scan directional signal determining whether the plurality of scan chains perform scan shifting in the first direction or the second direction. The signal processing circuit may comprise: an AND gate having the first signal and the second signal as inputs and having the scan enable signal as an output; and an OR gate having the first signal and the second signal as inputs and having the scan directional signal as an output.

The circuit may be a circuit block in a large circuit. The first signal may be delivered to the register through a network conforming to IEEE 1687-2014 (IJTAG). The second signal may be generated by circuitry in the large circuit. The circuitry may generate the second signal based on signals from a TAP (Test Access Port) controller.

The first signal may be delivered to the register through a data streaming mechanism before conducting a test.

The second signal may be generated by a tester while conducting a test.

The plurality of scan chains may comprise bidirection scan cells

In another aspect, there is one or more computer-readable media storing computer-executable instructions for causing a computer to perform a method for creating test circuitry in a circuit design for testing a chip fabricated according to the circuit design, the test circuitry comprising: a plurality of scan chains configured to perform scan shifting in two opposite directions; and a register configured to store a first signal, the first signal determining whether the plurality of scan chains operate in a first mode or a second mode, wherein the plurality of scan chains operating in the first mode is configured to perform, based on a second signal, either scan shifting in a first direction in the two opposite directions or scan capturing during a test, and wherein the plurality of scan chains operating in the second mode is configured to perform, based on the second signal, scan shifting in the first direction or a second direction in the two opposite directions.

The test circuitry may further comprise: a signal processing circuit configured to generate a scan enable signal and a scan directional signal based on the first signal and the second signal, the scan enable signal determining whether the plurality of scan chains perform scan shifting or scan capturing during a test, the scan directional signal determining whether the plurality of scan chains perform scan shifting in the first direction or the second direction. The signal processing circuit may comprise: an AND gate having the first signal and the second signal as inputs and having the scan enable signal as an output; and an OR gate having the first signal and the second signal as inputs and having the scan directional signal as an output.

The test circuitry may be in a circuit block in the circuit design. The first signal may be delivered to the register through a network conforming to IEEE 1687-2014 (IJTAG). The second signal may be generated by circuitry in the circuit design. The circuitry may generate the second signal based on signals from a TAP (Test Access Port) controller.

Certain inventive aspects are set out in the accompanying independent and dependent claims. Features from the dependent claims may be combined with features of the independent claims and with features of other dependent claims as appropriate and not merely as explicitly set out in the claims.

Certain objects and advantages of various inventive aspects have been described herein above. Of course, it is to be understood that not necessarily all such objects or advantages may be achieved in accordance with any particular embodiment of the disclosed techniques. Thus, for example, those skilled in the art will recognize that the disclosed techniques may be embodied or carried out in a manner that achieves or optimizes one advantage or group of advantages as taught herein without necessarily achieving other objects or advantages as may be taught or suggested herein.

DETAILED DESCRIPTION OF THE DISCLOSED TECHNIQUES

Figure 1:
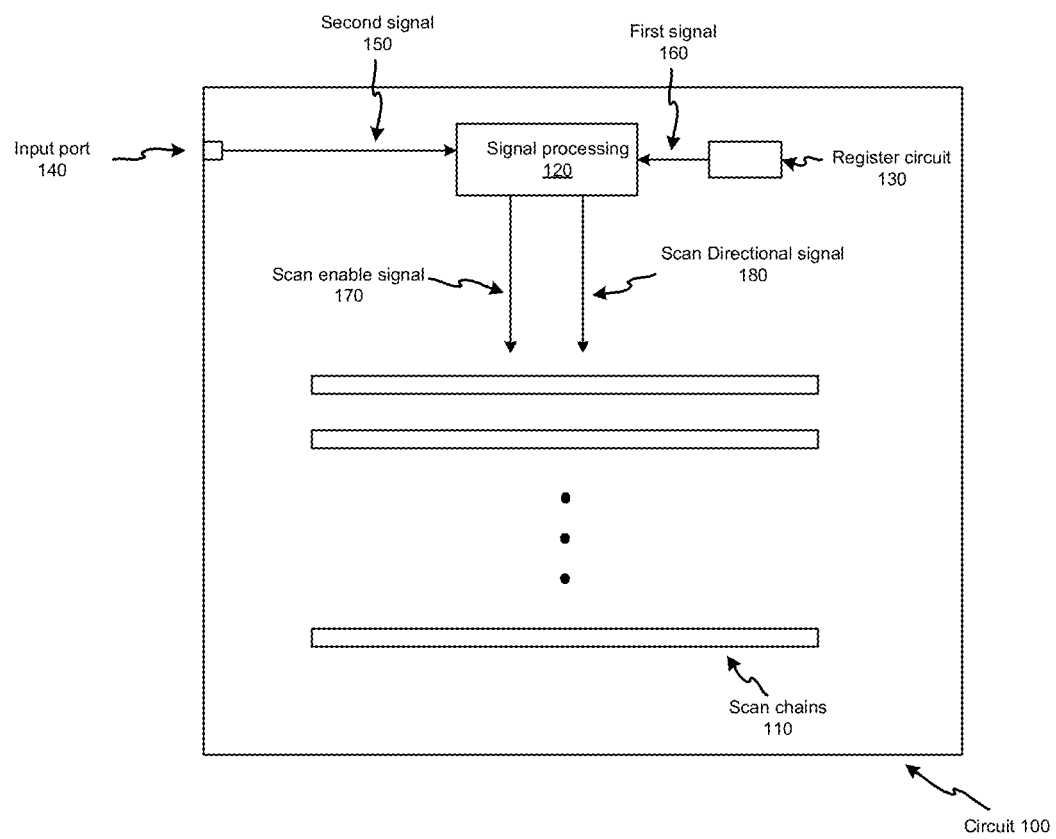
FIG. 1 illustrates an example of a block diagram of a circuit using a dynamically changed signal (second signal) and a stored signal (first signal) to control reversible scan shifting according to various examples of the disclosed technology.

Various aspects of the disclosed technology relate to low pin count scan architecture capable of bi-directional scan shifting. In the following description, numerous details are set forth for the purpose of explanation. However, one of ordinary skill in the art will realize that the disclosed technology may be practiced without the use of these specific details. In other instances, well-known features have not been described in details to avoid obscuring the disclosed technology.

Some of the techniques described herein can be implemented in software instructions stored on a computer-readable medium, software instructions executed on a computer, or some combination of both. Some of the disclosed techniques, for example, can be implemented as part of an electronic design automation (EDA) tool. Such methods can be executed on a single computer or on networked computers.

Although the operations of the disclosed methods are described in a particular sequential order for convenient presentation, it should be understood that this manner of description encompasses rearrangements, unless a particular ordering is required by specific language set forth below. For example, operations described sequentially may in some cases be rearranged or performed concurrently. Moreover, for the sake of simplicity, the disclosed flow charts and block diagrams typically do not show the various ways in which particular methods can be used in conjunction with other methods.

The detailed description of a method or a device sometimes uses terms like "perform" and "generate" to describe the disclosed method or the device function/structure. Such terms are high-level descriptions. The actual operations or functions/structures that correspond to these terms will vary depending on the particular implementation and are readily discernible by one of ordinary skill in the art.

Additionally, as used herein, the term "design" is intended to encompass data describing an entire integrated circuit device. This term also is intended to encompass a smaller group of data describing one or more components of an entire device such as a portion of an integrated circuit device nevertheless.

The reduction in feature size increases the probability that a manufacture defect in the integrated circuit will result in a faulty chip. A very small defect can result in a faulty transistor or interconnecting wire. Even a single faulty transistor or wire can cause the entire chip to function improperly. Manufacture defects are unavoidable nonetheless, no matter whether the manufacturing process is at the prototype stage or the high-volume manufacturing stage. It is thus necessary to test chips during the manufacturing process. Diagnosing faulty chips is also needed to ramp up and to maintain the manufacturing yield.

Testing typically includes applying a set of test stimuli (test patterns) to the circuit-under-test and then analyzing responses generated by the circuit-under-test. Functional testing attempts to validate that the circuit-under-test operates according to its functional specification while structural testing tries to ascertain that the circuit-under-test has been assembled correctly from some low-level building blocks as specified in a structural netlist and that these low-level building blocks and their wiring connections have been manufactured without defect. For structural testing, it is assumed that if functional verification has shown the correctness of the netlist and structural testing has confirmed the correct assembly of the structural circuit elements, then the circuit should function correctly. Structural testing has been widely adopted at least in part because it enables the test (test pattern) generation to focus on testing a limited number of relatively simple circuit elements rather than having to deal with an exponentially exploding multiplicity of functional states and state transitions.

To make it easier to develop and apply test patterns, certain testability features are added to circuit designs, which is referred to as design for test or design for testability (DFT). Scan testing is the most common DFT method. In a basic scan testing scheme, all or most of internal sequential state elements (latches, flip-flops, et al.) in a circuit design are made controllable and observable via a serial interface. These functional state elements are usually replaced with dual-purpose state elements called scan cells. Scan cells are connected together to form scan chains—serial shift registers for shifting in test patterns and shifting out test responses. A scan cell can operate as originally intended for functional purposes (functional/mission mode) and as a unit in a scan chain for scan (scan mode). A widely used type of scan cell include an edge-trigged flip-flop with two-way multiplexer for the data input. The two-way multiplexer is typically controlled by a single control signal called scan_enable, which selects the input signal for a scan cell from either a scan signal input port or a system signal input port. The scan signal input port is typically connected to an output of another scan cell while the system signal input port is connected to the functional logic. Scan cells can serve as both a control point and an observation point. Control points can be used to set certain logic values at some locations of the circuit-under-test, exciting (activating) a fault and propagating the incorrect value to an observation point. Scan testing allows the test equipment to access gates deeply embedded through the primary inputs/outputs and/or some physical test points and can remove the need for complicated state transition sequences when trying to control or observe what is happening at some internal circuit element.

Test patterns for scan testing are typically generated through an automatic test pattern generation (ATPG) process. ATPG usually focuses on a set of faults derived from a gate-level fault model. A defect is an error caused in a device during the manufacturing process. A fault model is a description of how a defect alters design behavior. In another word, a defect is a flaw or physical imperfection that may lead to a fault. For a given target fault, ATPG comprises two phases: fault activation and fault propagation. Fault activation establishes a signal value at the fault site opposite that produced by the fault. Fault propagation propagates the fault effect forward by sensitizing a path from a fault site to a scan cell or a primary output. A fault at a site is said to be detected by a test pattern if a test response value captured by a scan cell or a primary output is different than the expected value. The objective of ATPG is to find a test pattern that, when applied to the circuit, enables testers to distinguish between the correct circuit behavior and the faulty circuit behavior caused by one or more particular faults. Effectiveness of ATPG is measured by the fault coverage achieved for the fault model and the number of generated vectors (test pattern counts), which should be directly proportional to test application time. Here, the fault coverage is defined as a ratio of the number of detected faults vs. the total number of faults.

The most popular fault model used in practice is the single stuck-at fault model. In this model, one of the signal lines in a circuit is assumed to be stuck at a fixed logic value, regardless of what inputs are supplied to the circuit. The stuck-at fault model is a logical fault model because no delay information is associated with the fault definition. Delay faults cause errors in the functioning of a circuit based on its timing. They are caused by the finite rise and fall time periods of the signals in the gates, as well as, the propagation delay of interconnects between the gates. Transition faults are used for their simplicity in modeling spot defects that affect delays at inputs or outputs of gates. Under scan-based tests, the transition faults are associated with an extra delay that is large enough to cause the delay of any path through the fault site to exceed the clock period. Cell internal fault models can be derived using transistor-level circuit simulations (analog simulations). This approach can pinpoint the defect location within a cell for various cell internal defects.

During the circuit design and manufacturing process, a manufacturing test screens out chips (dies) containing defects. The test itself, however, does not identify the reason for the unacceptable low or fluctuating yield that may be observed. Physical failure analysis (PFA) can inspect the faulty chip to locate the defect location(s) and to discover the root cause. The process usually includes etching away certain layers and then imaging the silicon surface by scanning electronic microscopy or focused ion beam systems. This PFA process is laborious and time consuming. To facilitate the PFA process, diagnosis (also referred to as scan diagnosis) is often employed to narrow down possible locations of the defect(s) based on analyzing the fail log (fail file, failure file, or failure report). The fail log typically contains information about when (e.g., tester cycle), where (e.g., at what tester channel), and how (e.g., at what logic value) the test failed and which test patterns generate expected test responses. The layout information of the circuit design may also be employed to further reduce the number of defect suspects.

Diagnosis includes logic diagnosis (sometimes referred to as scan diagnosis or diagnosis) and chain diagnosis. Logic diagnosis may employ a fault dictionary or directly examine the syndrome (i.e., the effect) of the failing chip to determine likely defect locations (defect suspects). The latter approach may include structural pruning (backtracing), fault injection, and evaluation (fault simulation for both failing and passing test patterns). The quality of diagnosis can be measured by diagnostic resolution (the number of the real defects vs. the number of the defect suspects). Diagnostic resolution is linked not only to the algorithm used for diagnosis but also to the test patterns used for the manufacturing test (manufacturing test patterns). To enhance the diagnosis quality, a diagnostic test pattern generation process may be employed. This process generates test patterns that can refine the set of defect suspects.

Chain diagnosis determines scan cells that are likely to be defective. In a chain diagnosis process, two types of test patterns may be used. The first type is called chain patterns. A chain pattern is a pattern used in a process comprising shift-in and shift-out without pulsing capture clocks. The other type is often referred to as scan patterns. A scan pattern is a pattern used in a process comprising shift-in, one or multiple capture clock cycles, and shift-out, and the scan patterns include patterns generated by ATPG for testing system logic, special chain diagnostic patterns generated only for scan chain diagnosis purpose and some special functional patterns. Chain patterns can be used to test the integrity of scan chains and/or determine fault models associated with faulty scan chains while scan patterns can be used to inject certain values to some scan cells for locating defective scan cells.

Test application in chip manufacturing test is normally performed by automatic test equipment (ATE) (a type of testers). Scan-based tests consume significant amounts of storage and test time on ATE. The data volume increases with the number of logic gates on the chip and the same holds for the number of scan cells. Yet, practical considerations and ATE specifications often limit both the number of pins available for scan in/out and the maximum scan frequency. It is highly desirable to reduce the amount of test data that need to be loaded onto ATE and ultimately to the circuit under test. Fortunately, test patterns are compressible mainly because only 1% to 5% of test pattern bits are typically specified bits (care bits) while the rest are unspecified bits (don't-care bits). Unspecified bits can take on any values with no impact on the fault coverage. Test compression may also take advantage of the fact that test cubes tend to be highly correlated. A test cube is a deterministic test pattern in which the don't-care bits are not filled by ATPG. The correlation exists because faults are structurally related in the circuit.

Various test compression techniques have been developed. In general, additional on-chip hardware before and after scan chains is inserted. The hardware (decompressor) added before scan chains is configured to decompress test stimulus coming from ATE, while the hardware (compactor) added after scan chains is configured to compact test responses captured by the scan chains. The decompressor expands the data from n tester channels to fill greater than n scan chains. The increase in the number of scan chains shortens each scan chain and thus reduces the number of clock cycles needed to shift in each test pattern. Thus, test compression can reduce not only the amount of data stored on the tester but also the test time for a given test data bandwidth.

All of the above mentioned processes, design insertion for testing, test pattern generation, and logic diagnosis, are normally performed by various electronic design automation tools such as those in the Tessent family of software tools available from Mentor Graphics Corporation, Wilsonville, Oreg.

FIG. 1 illustrates an example of a block diagram of a circuit 100 using a dynamically changed signal (second signal 150) and a stored signal (first signal 160) to control reversible scan shifting according to various examples of the disclosed technology. The circuit 100 comprises a plurality of scan chains 110, a signal processing circuit 120, a register circuit 130, and an input port 140. The plurality of scan chains 110 can be configured to perform scan shifting in two opposite directions: left and right. The register circuit 130 can store a first signal 160. The first signal 160 may be stored as a single bit in the register circuit 130 or as a plurality of bits in the register circuit 130. The register circuit 130 can be a single bit register or a multi-bit register. The register circuit 130 can also be used to store other information in addition to the first signal. The first signal 160 determines whether the plurality of scan chains 110 operate in a first mode or a second mode. In the first mode, the plurality of scan chains 110 is configured to perform, based on a second signal 150 received from the input port 140, either scan shifting in a first direction in the two opposite directions or scan capturing during a test. In the second mode, the plurality of scan chains 110 is configured to perform, based on the second signal 150, scan shifting in the first direction (e.g, left) or the second direction (e.g., right) in the two opposite directions. The second signal 150 may be supplied by a tester. The signal processing circuit 120 is configured to generate a scan enable signal 170 and a scan directional signal 180 based on the first signal 160 and the second signal 150. The scan enable signal 170 controls whether the scan cells on the plurality of scan chains 110 receive input signals from outputs of their neighboring scan cells for scan shifting or the functional circuit for scan capturing during either a test or for functional operation of the circuit 100. The scan directional signal 180 controls the shift direction of the plurality of scan chains 110 during a shift operation either in the first mode or the second mode.

Figure 2:
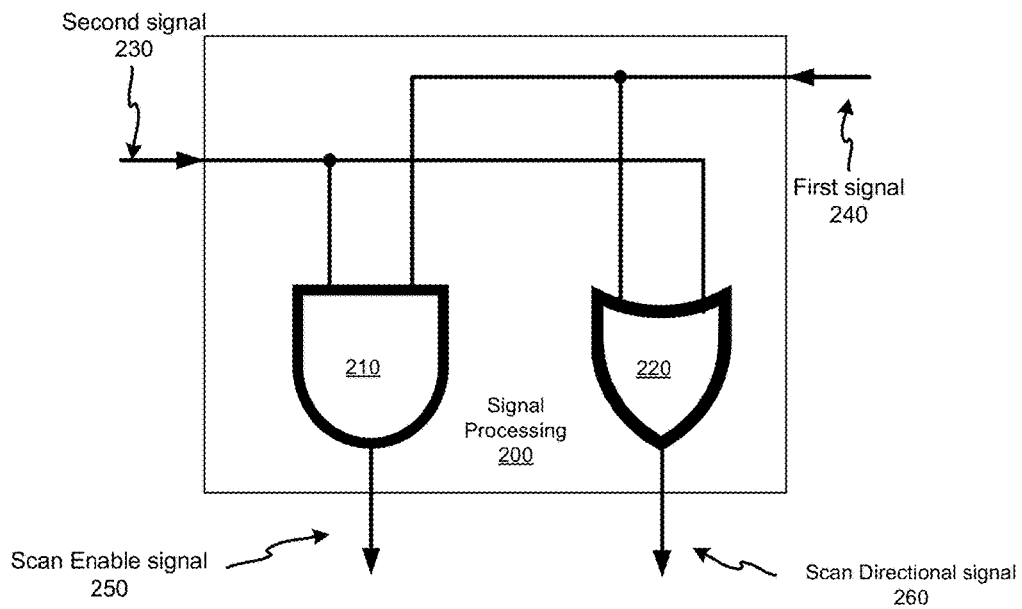
FIG. 2 illustrates an example of a circuit diagram of a signal processing circuit and an associated truth table according to various examples of the disclosed technology.

FIG. 2 illustrates an example of a circuit diagram of a signal processing circuit 200 and an associated truth table 205 according to various examples of the disclosed technology. The signal processing circuit 200 comprises an AND gate 210 and an OR gate 220. The AND gate 210 combines a first signal 240 and a second signal 230 to generate a scan enable signal 250; and the OR gate 220 combines the first signal 240 and the second signal 230 to generate a scan directional signal 260. As the table 205 shows, scan chains will operate in the first mode when the first signal 240 is 1 and in the second mode when the first signal 240 is 0. In the first mode, the scan enable signal 250 follows the second signal 230: the scan chains will perform scan capturing when the second signal 230 is 1 and scan shifting in one direction (e.g., left) when the second signal 230 is 0. It should be noted that the AND gate 210 may be replaced by an NAND gate. In this case, the scan chains will perform scan capturing when the second signal 230 is 0 and scan shifting in one direction (e.g., left) when the second signal 230 is 1. In the second mode, the scan chains always perform scan shifting because the scan enable signal 250 remains at 0 (or 1 if the AND gate 210 may be replaced by an NAND gate) and the shift directional signal 260 follows the second signal 230: the scan chains perform scan shifting to, for example, left when the second signal 230 is 1 and right when the second signal 230 is 0. If the OR gate 220 is replaced by a NOR gate, the scan chains perform scan shifting to left when the second signal 230 is 1 and right when the second signal 230 is 0 in the second mode.

It should be noted that whether operating in the first mode and the second mode can be set before a test while the scan enable signal 250 in the first mode and the scan directional signal 260 in the second mode need to be changed during a test: scan shift—scan capture for the former and shift left—shift right for the latter. Accordingly, the first signal 240 may be stored in a register while the second signal 230 should be dynamically changeable during a test.

Figure 3:
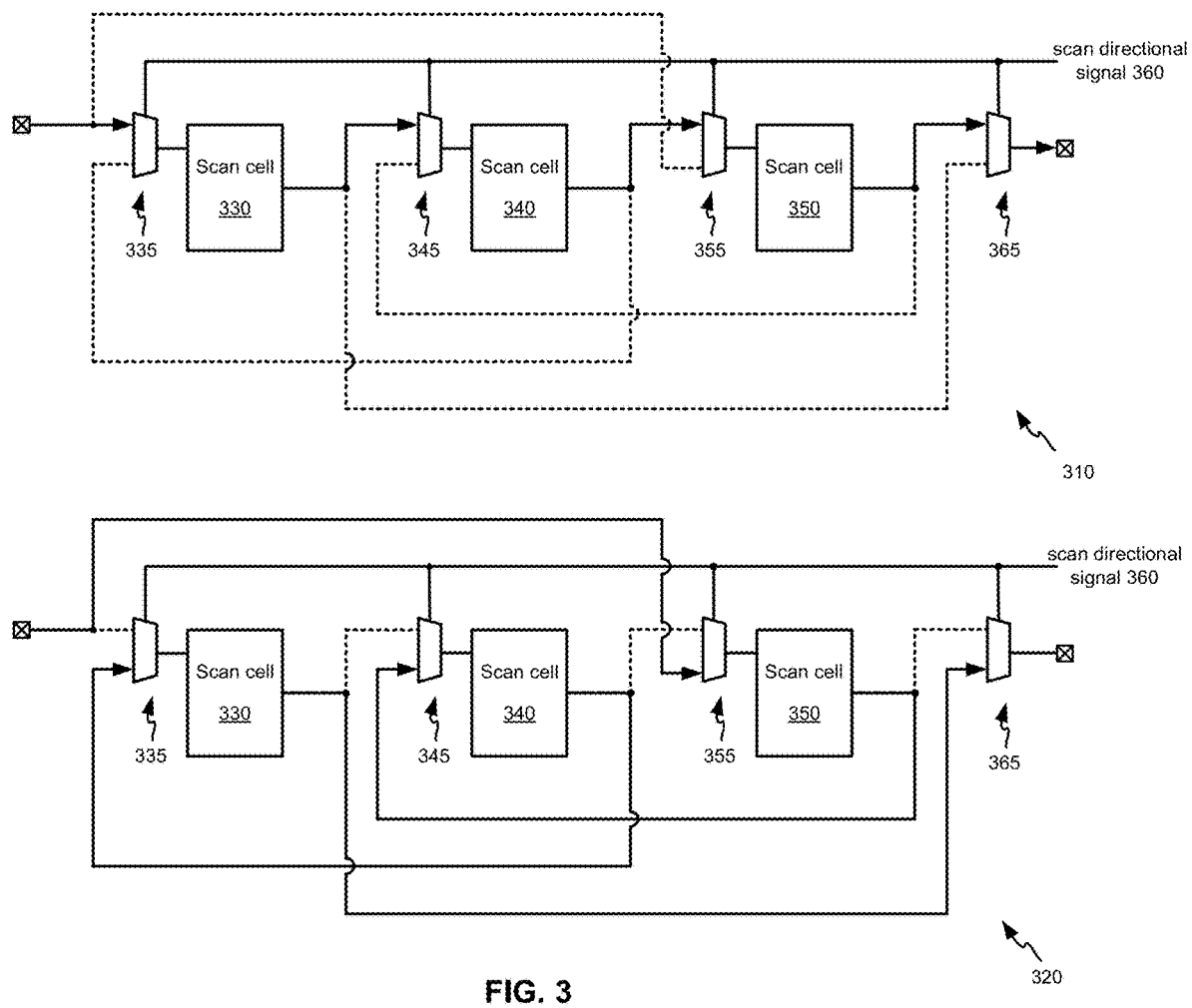
FIG. 3 illustrates an example of two block diagrams of a reversible scan chain that may be used to implement the scan chains shown in FIGS. 1 and 2.

FIG. 3 illustrates an example of two block diagrams 310 and 320 of a reversible scan chain that may be used to implement the scan chains shown in FIG. 1. The scan chain comprises three scan cells 330, 340, 350 and four multiplexers 335, 345, 355, 365. A scan directional signal 360 supplied serves as the selection signal for the four multiplexers 335-365. In the block diagram 310, the scan directional signal 360 enables a scan path following a sequence of multiplexer 335—scan cell 330—multiplexer 345—scan cell 340—multiplexer 355—scan cell 350—multiplexer 365, shown by solid lines with arrows. In the block diagram 320, the scan directional signal 360 reverses and enables a different scan path multiplexer 355—scan cell 350—multiplexer 345—scan cell 340—multiplexer 335—scan cell 330—multiplexer 365, shown by solid lines with arrows. The two paths do share common segments such as the one between multiplexer 335 and scan cell 330, but many other segments are unique for either the forward path or the backward path. In the figure, the scan enable signal is not shown.

Figure 4:
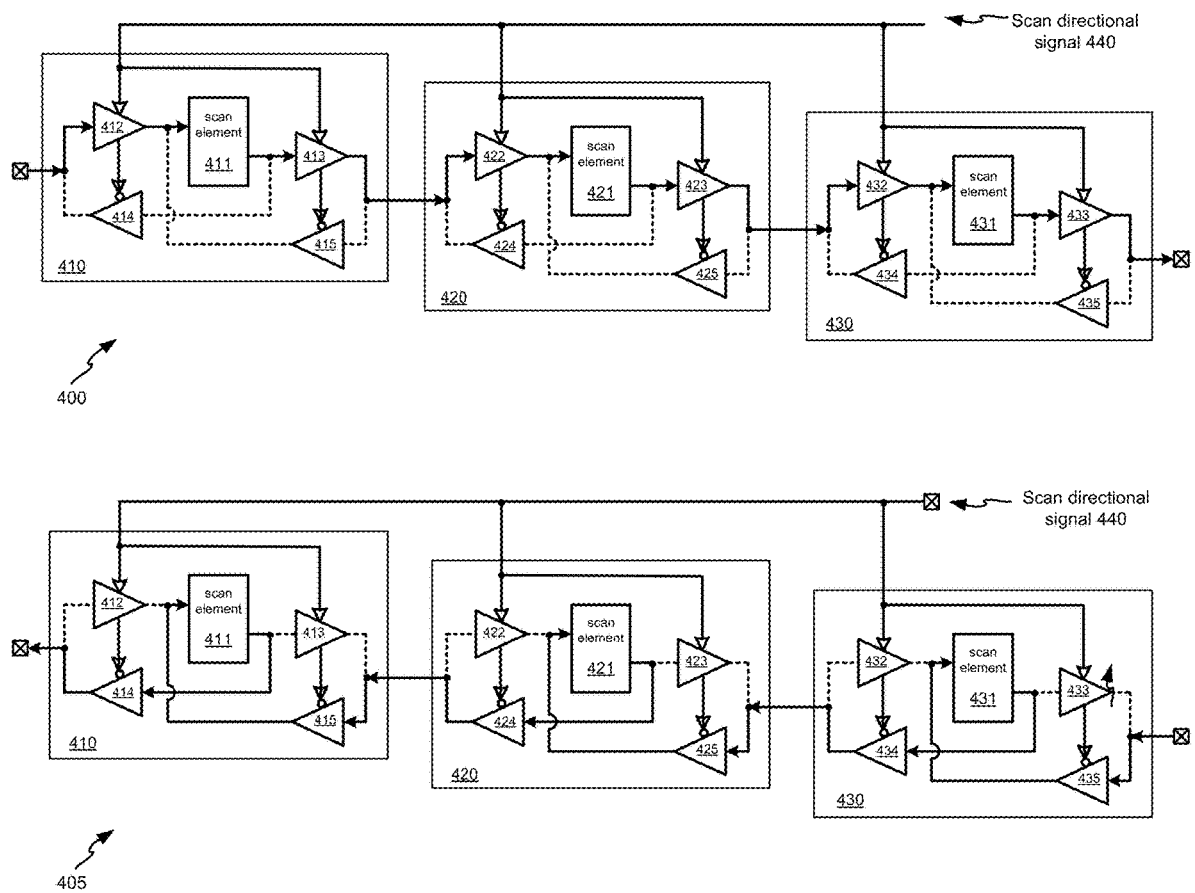
FIG. 4 illustrates an example of two block diagrams of a reversible scan chain comprising bidirectional scan cells that may be used to implement the scan chains shown in FIGS. 1 and 2.

FIG. 4 illustrates an example of two block diagrams 400 and 405 of a reversible scan chain comprising bidirectional scan cells that may be used to implement the scan chains shown in FIGS. 1 and 2. The reversible scan chain comprises three bidirectional scan cells 410, 420, 430. Each of the bidirectional scan cells 410, 420, 430 comprises a scan element (411, 421, 431), a pair of tri-state buffers (412/413, 422/423, 432/433) controlled by a scan directional signal 440, and a pair of tri-state buffers (414/415, 424/425, 434/435) controlled by inversion of the scan directional signal 440. Here, a scan element comprises a state element such as a flip-flop.

In the block diagram 400, the scan directional signal 440 is asserted. The tri-state buffer pairs 412/413, 422/423, 432/433 are in a state allowing their outputs to follow their inputs, whereas the tri-state buffer pairs 414/415, 424/425, 434/435 are in a high impedance state which blocks their outputs. As such, the signal path in a shift operation follows a sequence of tri-state buffer 412—scan element 411—tri-state buffer 413—tri-state buffer 422—scan element 421—tri-state buffer 423—tri-state buffer 432—scan element 431—tri-state buffer 433. The direction of the shift operation is thus from left to right the scan directional signal 440 is asserted.

In the block diagram 405, the scan directional signal 440 is deasserted. The tri-state buffer pairs 414/415, 424/425, 434/435 are in a state allowing their outputs to follow their inputs, whereas the tri-state buffer pairs 412/413, 422/423, 432/433 are in a high impedance state which blocks their outputs. As such, the signal path in a shift operation follows a sequence of tri-state buffer 433—scan element 431—tri-state buffer 432—tri-state buffer 423—scan element 421—tri-state buffer 422—tri-state buffer 413—scan element 431—tri-state buffer 412. The direction of the shift operation is thus from right to left when the scan directional signal 440 is deasserted. Again, the scan enable signal is not shown in the figure.

Figure 5:
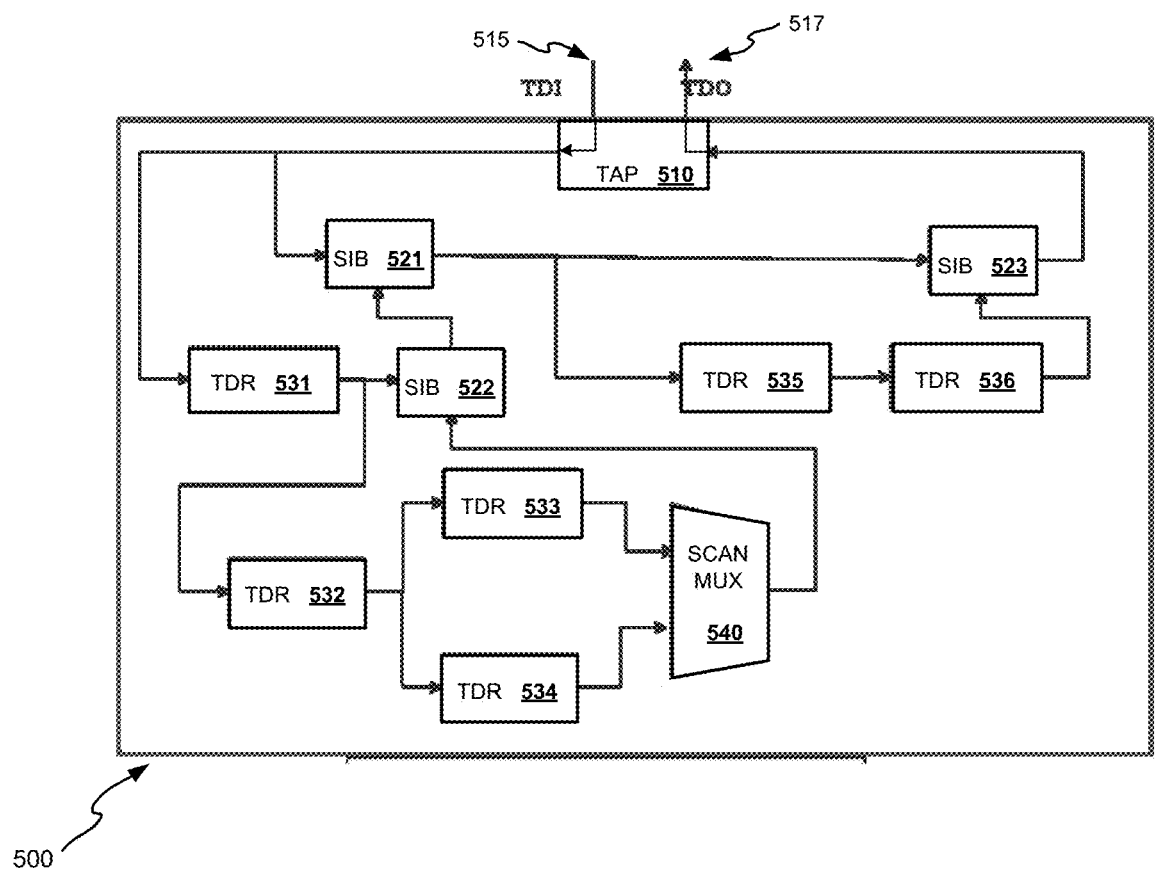
FIG. 5 illustrates an example of a reconfigurable scan network conforming to IEEE 1687-2014 (IJTAG) which can be used to deliver a first signal like the first signal 160 to be stored in register circuitry like the register circuitry 130 in FIG. 1 prior to a test.

FIG. 5 illustrates an example of a reconfigurable scan network 500 conforming to IEEE 1687-2014 (IJTAG) which can be used to deliver a first signal like the first signal 160 to be stored in register circuitry like the register circuitry 130 in FIG. 1 prior to a test. In this IJTAG network 500, a SIB (Segment Insertion Bit) 523 switches between two different access paths between a TDI (Test Data In) port 515 and a TDO (Test Data Out) port 517, which both belong to a TAP (Test Access Port) 510. The shorter access path directly connects the SIB 523 to a SIB 521 while the longer access path connects the SIB 523 to the SIB 521 through two TDRs (Test Data Registers) 535 and 536. In a similar way, a ScanMux (multiplexer) 540 combines two scan segments of the access network 500 and can select either one based on control data received.

As FIG. 5 shows, programmable components of a reconfigurable scan network such as the SIBs 521-523 and the ScanMux 540 in the scan network 500 allow the dynamic configuration of the access network to bring a specific circuit block into the scope of the access network. These programmable components can be programmed by shifting configuration data into the shift flip-flops of the control register in them and latching the shifted bits into the parallel latches. The first signal can be delivered to one or more of the TDRs 531-536 in this way. This dynamic access network configuration minimizes the number of shift operations needed for initializing a test of the desired circuit block(s).

Other test access mechanisms can also be employed to deliver the first signal 160 to the register circuit 130 in various circuit blocks in a circuit. One example is the test access mechanism conforming to IEEE 1500 (SECT (Standard for Embedded Core Test)). Another example is a data streaming mechanism such as those described in U.S. patent application Ser. Nos. 15/925,642 and 15/925,657; and U.S. Pat. Nos. 10,476,740 and 10,473,721.

Figure 6:
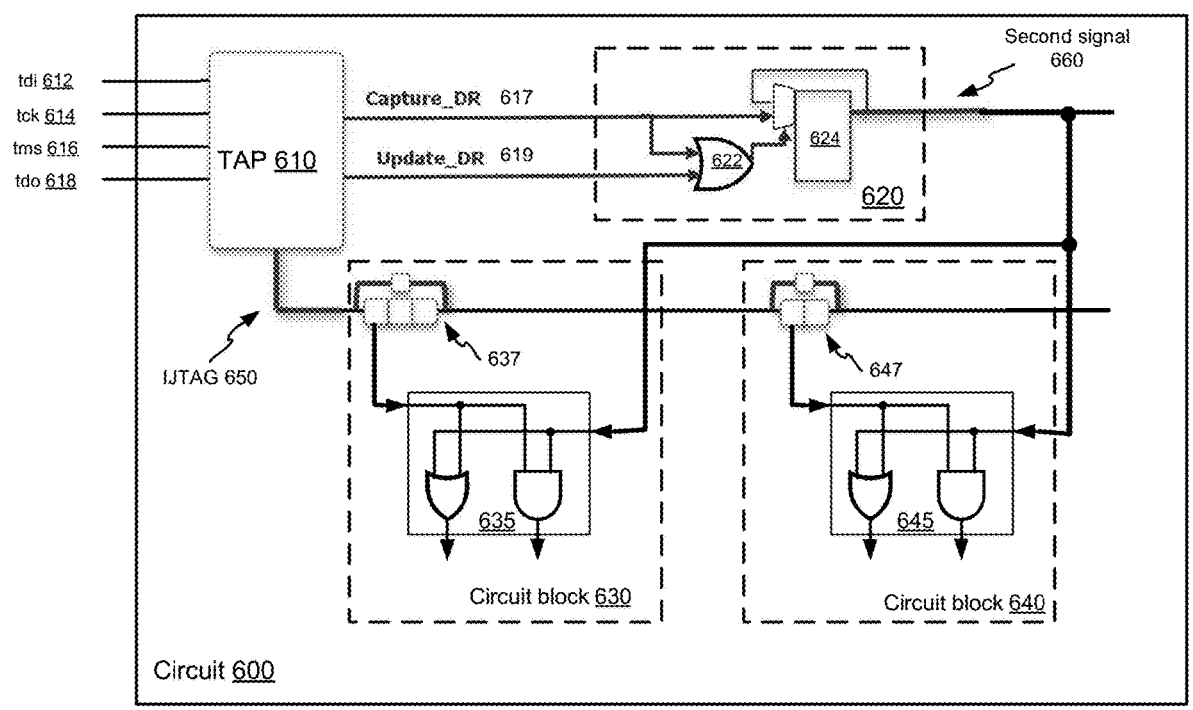
FIG. 6 illustrates an example of a circuit in which a second signal like the second signal 150 in FIG. 1 is generated within the circuit according to various embodiments of disclosed technology.

FIG. 6 illustrates an example of a circuit 600 in which a second signal 660 like the second signal 150 in FIG. 1 is generated within the circuit 600 according to various embodiments of disclosed technology. The circuit 600 comprises: circuit blocks 630 and 640, a signal generation circuit 620, and a TAP (Test Access Port) controller 610. The TAP controller 610 are coupled to TAP ports comprising a TDI (Test Data In) port 612, a TDO (Test Data Out) port 618, a TCK (Test Clock) port 614, and a TMS (Test Mode Select) port 616. The TAP controller 610 is a 16-state machine, programmed by signals from the TCK port 614 and the TMS port 616, which controls the flow of data bits to the Instruction Register (IR) and the Data Registers (DR). Signals from two of the Data Registers, Capture_DR (617) and Update_DR (619), can be used to drive the signal generation circuit 620. The signal generation circuit 620 comprises an OR gate 622 and flip-flop 624, and generates the second signal 660 for the circuit blocks 630 and 640. Each of the circuit blocks 630 and 640 comprises a data register (data register 637 for circuit block 630, data register 647 for circuit block 640) and a signal processing circuit (circuit 635 for circuit block 630 and circuit 645 for circuit block 640). A first signal like the first signal 130 is delivered to the data registers 637 and 647 through an IJTAG network 650. The signal processing circuits 635 and 645 generate the scan enable signals like the scan enable signal 170 in FIG. 1 and the scan directional signals like the scan directional signal 180 in FIG. 1 based on the stored first signal and the dynamically changed second signal 660.

Figure 7:
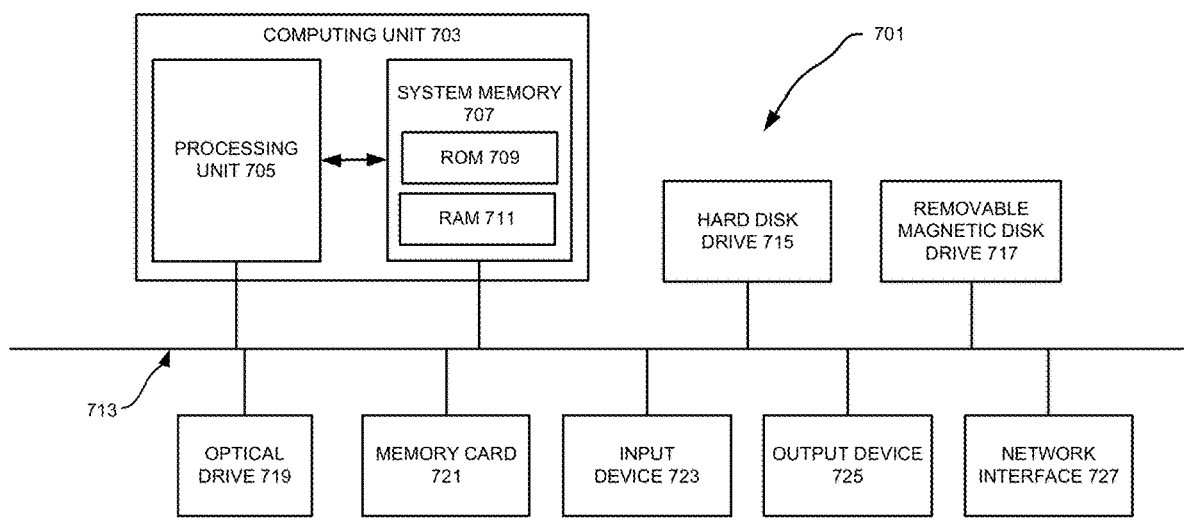
FIG. 7 illustrates a programmable computer system with which various embodiments of the disclosed technology may be employed.

Various examples of the disclosed technology may be implemented through the execution of software instructions by a computing device, such as a programmable computer. For example, the computing device may be caused to perform a method for creating test circuitry in a circuit design for testing a chip fabricated according to the circuit design. Accordingly, FIG. 7 shows an illustrative example of a computing device 701. As seen in this figure, the computing device 701 includes a computing unit 703 with a processing unit 705 and a system memory 707. The processing unit 705 may be any type of programmable electronic device for executing software instructions, but it will conventionally be a microprocessor. The system memory 707 may include both a read-only memory (ROM) 709 and a random access memory (RAM) 711. As will be appreciated by those of ordinary skill in the art, both the read-only memory (ROM) 709 and the random access memory (RAM) 711 may store software instructions for execution by the processing unit 705.

The processing unit 705 and the system memory 707 are connected, either directly or indirectly, through a bus 713 or alternate communication structure, to one or more peripheral devices. For example, the processing unit 705 or the system memory 707 may be directly or indirectly connected to one or more additional memory storage devices, such as a "hard" magnetic disk drive 715, a removable magnetic disk drive 717, an optical disk drive 719, or a flash memory card 721. The processing unit 705 and the system memory 707 also may be directly or indirectly connected to one or more input devices 723 and one or more output devices 725. The input devices 723 may include, for example, a keyboard, a pointing device (such as a mouse, touchpad, stylus, trackball, or joystick), a scanner, a camera, and a microphone. The output devices 725 may include, for example, a monitor display, a printer and speakers. With various examples of the computer 701, one or more of the peripheral devices 715-725 may be internally housed with the computing unit 703. Alternately, one or more of the peripheral devices 715-725 may be external to the housing for the computing unit 703 and connected to the bus 713 through, for example, a Universal Serial Bus (USB) connection.

With some implementations, the computing unit 703 may be directly or indirectly connected to one or more network interfaces 727 for communicating with other devices making up a network. The network interface 727 translates data and control signals from the computing unit 703 into network messages according to one or more communication protocols, such as the transmission control protocol (TCP) and the Internet protocol (IP). Also, the interface 727 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computer 701 is illustrated as an example only, and it is not intended to be limiting. Various embodiments of the disclosed technology may be implemented using one or more computing devices that include the components of the computer 701 illustrated in FIG. 7, which include only a subset of the components illustrated in FIG. 7, or which include an alternate combination of components, including components that are not shown in FIG. 7. For example, various embodiments of the disclosed technology may be implemented using a multi-processor computer, a plurality of single and/or multiprocessor computers arranged into a network, or some combination of both.

Having illustrated and described the principles of the disclosed technology, it will be apparent to those skilled in the art that the disclosed embodiments can be modified in arrangement and detail without departing from such principles. In view of the many possible embodiments to which the principles of the disclosed technologies can be applied, it should be recognized that the illustrated embodiments are only preferred examples of the technologies and should not be taken as limiting the scope of the disclosed technology. Rather, the scope of the disclosed technology is defined by the following claims and their equivalents. We therefore claim as our disclosed technology all that comes within the scope and spirit of these claims.

What is claimed is:

1. A circuit, comprising:
a plurality of scan chains configured to perform scan shifting in two opposite directions; and
a register configured to store a first signal, the first signal determining whether the plurality of scan chains operate in a first mode or a second mode, wherein the plurality of scan chains operating in the first mode is configured to perform, based on a second signal, either scan shifting in a first direction in the two opposite directions or scan capturing during a test, and wherein the plurality of scan chains operating in the second mode is configured to perform, based on the second signal, scan shifting in the first direction or a second direction in the two opposite directions.

2. The circuit recited in claim 1 being a circuit block in a large circuit.

3. The circuit recited in claim 2, wherein the first signal is delivered to the register through a network conforming to IEEE 1687-2014 (IJTAG).

4. The circuit recited in claim 2, wherein the second signal is generated by circuitry in the large circuit.

5. The circuit recited in claim 4, wherein the circuitry generates the second signal based on signals from a TAP (Test Access Port) controller.

6. The circuit recited in claim 1, wherein the first signal is delivered to the register through a data streaming mechanism before conducting a test.

7. The circuit recited in claim 1, wherein the second signal is generated by a tester while conducting a test.

8. The circuit recited in claim 1, wherein the plurality of scan chains comprising bidirection scan cells.

9. The circuit recited in claim 1, further comprising:
a signal processing circuit configured to generate a scan enable signal and a scan directional signal based on the first signal and the second signal, the scan enable signal determining whether the plurality of scan chains perform scan shifting or scan capturing during a test, the scan directional signal determining whether the plurality of scan chains perform scan shifting in the first direction or the second direction.

10. The circuit recited in claim 9, wherein the signal processing circuit comprises:
an AND gate having the first signal and the second signal as inputs and having the scan enable signal as an output; and
an OR gate having the first signal and the second signal as inputs and having the scan directional signal as an output.

11. One or more non-transitory computer-readable media storing computer-executable instructions for causing a computer to perform a method for creating test circuitry in a circuit design for testing a chip fabricated according to the circuit design, the test circuitry comprising:

a plurality of scan chains configured to perform scan shifting in two opposite directions; and a register configured to store a first signal, the first signal determining whether the plurality of scan chains operate in a first mode or a second mode, wherein the plurality of scan chains operating in the first mode is configured to perform, based on a second signal, either scan shifting in a first direction in the two opposite directions or scan capturing during a test, and wherein the plurality of scan chains operating in the second mode is configured to perform, based on the second signal, scan shifting in the first direction or a second direction in the two opposite directions.

12. The one or more non-transitory computer-readable media recited in claim 11, wherein the test circuitry is in a circuit block in the circuit design.

13. The one or more non-transitory computer-readable media recited in claim 12, wherein the first signal is delivered to the register through a network conforming to IEEE 1687-2014 (IJTAG).

14. The one or more non-transitory computer-readable media recited in claim 12, the second signal is generated by circuitry in the circuit design.

15. The one or more non-transitory computer-readable media recited in claim 14, wherein the circuitry generates the second signal based on signals from a TAP (Test Access Port) controller.

16. The one or more non-transitory computer-readable media recited in claim 11, wherein the first signal is delivered to the register through a data streaming mechanism before conducting a test.

17. The one or more non-transitory computer-readable media recited in claim 11, wherein the second signal is generated by a tester while conducting a test.

18. The one or more non-transitory computer-readable media recited in claim 11, wherein the plurality of scan chains comprising bidirection scan cells.

19. The one or more non-transitory computer-readable media recited in claim 11, wherein the test circuitry further comprises:

a signal processing circuit configured to generate a scan enable signal and a scan directional signal based on the first signal and the second signal, the scan enable signal determining whether the plurality of scan chains perform scan shifting or scan capturing during a test, the scan directional signal determining whether the plurality of scan chains perform scan shifting in the first direction or the second direction.

20. The one or more non-transitory computer-readable media recited in claim 19, wherein the signal processing circuit comprises:

an AND gate having the first signal and the second signal as inputs and having the scan enable signal as an output; and an OR gate having the first signal and the second signal as inputs and having the scan directional signal as an output.

* * * * *